United States Patent [19]

Reese et al.

[11] Patent Number: 4,526,598

[45] Date of Patent: Jul. 2, 1985

[54] METHOD AND APPARATUS FOR FORMING A BUNDLE OF GLASS FILAMENTS

[75] Inventors: Walter J. Reese, North Huntington; George T. Salego, Brackenridge, both of Pa.

[73] Assignee: PPG Industries, Inc., Pittsburgh, Pa.

[21] Appl. No.: 567,021

[22] Filed: Dec. 30, 1983

[51] Int. Cl.³ .............................................. C03B 37/03
[52] U.S. Cl. .......................................... 65/3.1; 65/4.3; 65/10.1; 242/43.2; 242/155 R; 242/157 R
[58] Field of Search .................... 65/10.1, 4.3, 3.1; 242/157 R, 155 R, 43.2

[56] References Cited

U.S. PATENT DOCUMENTS

| | | | |
|---|---|---|---|
| 2,764,367 | 9/1956 | Brey | 242/155 R |
| 3,000,591 | 9/1961 | Backlin | 242/155 R |
| 3,876,404 | 4/1975 | Drummond | 65/2 |
| 3,999,970 | 12/1976 | Barch et al. | 65/2 |
| 4,085,487 | 4/1978 | Barch et al. | 28/252 |

*Primary Examiner*—Arthur Kellogg
*Attorney, Agent, or Firm*—Kenneth J. Stachel

[57] ABSTRACT

A filamentary gathering apparatus, apparatus for forming filaments into a gathered bundle of filaments, and a method of forming gathered filaments into a bundle of filaments according to the present invention result in a reduced tendency of the filaments and/or gathered filaments to wrap around the gathering apparatus. The gathering apparatus is a cylindrically shaped gathering shoe having a height much smaller than the diameter of the shoe and having an annular recess providing for a peripheral groove in the shoe. The groove has a plurality of holes extending radially toward the center of the gathering shoe and up the side of the groove. The apparatus for forming filaments has a fiber forming means, an applicator, one or more rotating gathering shoes and a winder mechanism. The one or more rotatable gathering shoes have the groove with radially extending holes. The method of forming the bundle of filaments from a heat softenable, fiberizable material includes forming the filaments, applying a chemical treatment to the filaments, gathering the filaments into one or more strands by using one or more gathering shoes having the groove with radially extending holes and winding the one or more strands into a package.

12 Claims, 3 Drawing Figures

METHOD AND APPARATUS FOR FORMING A BUNDLE OF GLASS FILAMENTS

The present invention is directed to an apparatus for forming a bundle from a plurality of filaments formed from heat softened, fiberizable material.

Filamentary material is formed from a source of heat softened, fiberizable material by numerous processes, one of which is a mechanical attenuation process through small diameter orifices of a bushing or spinerette. In this attenuation process, the individual filaments may be subjected to water sprays to cool the filaments and/or to assist in cleaning the essential operating components in the forming process. In addition, the individual filaments can be treated with myriad types of chemical treatments. Afterwards, a plurality of the filaments are gathered into one or more bundles, usually referred to as strands. An example of this filament forming process is the formation of glass fibers from molten streams of glass issuing from small orifices in a bushing containing molten glass. The number of these orifices can range from about 200 to several thousand or even more. These individual filaments are coated with a lubricant binder and/or size and are gathered into one or more unified strands by one or more gathering shoes. Such shoes are conventionally formed of materials such as graphite, tetrafluoroethylene, abrasion resistant metals and polymeric materials and the like. These gathering devices have been used in both stationary and rotating positions.

When the gathering shoe is used in the rotating position, the filaments or strands which are drawn across it may tend to wrap around the rotating gathering shoe. The tendency for wrapping is increased in a wet fiber forming environment because the wet fibers or strands tend to stick to the rotating gathering shoe. The wrapping and sticking of the filaments and/or strands results in breaks in the filaments and/or strands causing a stoppage in the attenuation process. This wrapping problem is especially troublesome where a rotating gathering shoe acts as the index for the speed control of the winder that provides the attenuation force for the fibers to be gathered into the one or more strands and wrapped into a package. In this situation, even a minor degree of wrapping, which may not cause a stoppage in the attenuation process may cause the filaments or strands to be drawn out of yardage.

By means of the present invention, the wrapping of the fibers and/or strands around a rotating gathering shoe in a filament attenuation process is reduced.

SUMMARY OF THE INVENTION

Accordingly, the present invention comprises a filament forming means which contains heat softened, fiberizable material from which the filaments are drawn, an applicator for applying chemical treatments, a rotating gathering shoe to gather a plurality of the filaments into a bundle of filaments, and a winder mechanism. The gathering shoe has a cylindrical shape with its diameter larger than its height and has an angular groove with opposing and bottom sides for receiving the plurality of filaments and issuing the bundle of filaments. The annular groove has a plurality of spaced apart radial slots which extend into the center of the shoe for a distance less than the entire radial distance of the shoe. The slots have opposing and bottom sides. As the plurality of filaments are first contacted by the annular groove in the rotating gathering shoe, the filaments converge into one bundle of filaments so as to form the shape of a fan from the filament forming means to the gathering shoe. This gathering of filaments into one bundle of filaments by one rotating gathering shoe is accomplished with a reduced tendency of the filaments and strands to wrap around the rotating shoe. The rotating shoe rotates about its central axis which passes through the cylindrical gathering shoe and which contains a support member on or about which the shoe rotates. It is also within the scope of the invention to have a plurality of gathering shoes rotatably mounted on or with one or more support members.

DETAILED DESCRIPTION OF THE DRAWINGS

Figure 1:
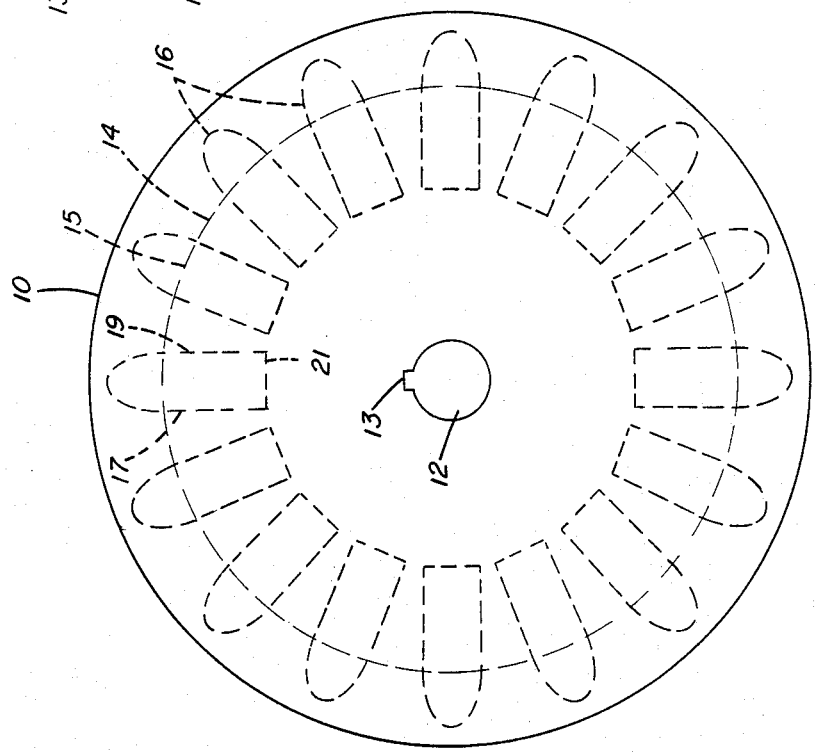
FIG. 1 is a diagramatic illustration of the front planar view of the gathering shoe of the present invention.

Turning now to FIG. 1, the gathering shoe mechanism is shown in a front planar view showing the circular shape of the gathering shoe from this perspective. The gathering shoe can be made of material such as graphite, metals such as steel, particularly metals that are more resistant to abrasion by the filaments, and polymeric material like urea, melamine and/or phenolic aldehyde condensate materials, an example of which is Micarta ® laminate. The shoe 10 has an opening 12 along the central axis of shoe 10 perpendicular to the circular plane of the shoe. The opening 12 has a keyway 13 for rotatable placement on a support shaft shown in FIG. 2.

Figure 2:
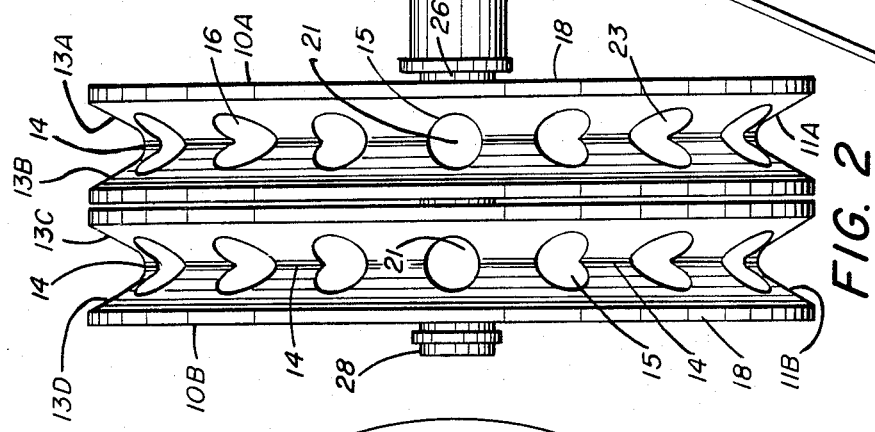
FIG. 2 is a side view of a plurality of gathering shoes on a support member of the present invention.

In phantom in FIG. 1, there is shown the bottom 14 of the annular groove 11 which runs along the peripheral surface of the gathering shoe and which is more clearly shown in FIG. 2. The bottom surface 14 of the groove has spaced apart radial holes 15 extending toward the central axis 12 of the gathering shoe 10. The holes 15 have opposing sides 17 and 19 and a bottom 21. The holes 15 do not extend completely to the central axis of the gathering shoe at opening 12. The distance which the holes extend radially into the shoe from the bottom surface 14 of the groove can vary with the maximum extension dependent on the number of spaced apart holes. The distance the holes extend generally ranges from just below the surface of the bottom surface 14 of the groove 11 to a distance just short of where the side surfaces near the bottom surfaces of the holes would contact each other. Such contact would structurally weaken the rotating shoe. The spacing and number of the spaced apart holes 15 is sufficient to reduce the surface contact area experienced by the filaments and strands by about 20 to about 70 percent over a shoe with no holes. This reduction is at the revolutions per minute of a free-wheeling rotating shoe, where rotation is caused by contact with the moving filaments. Lower percentages would not be sufficient to noticeably reduce wrapping and greater percentages than around 70 percent could result in strand abrasion. The dimensions of the holes 15 can range from a diameter at least as great as the diameter of the strand. The shape of the holes 15 can be any shape having opposing sides including the preferred cylindrical shape.

FIG. 2 shows a side view of a plurality of gathering shoes 10A and 10B, where the annular grooves 11A and 11B are evident at the top and bottom portions of the gathering shoes. The groove as shown in FIG. 2 is a V-shaped groove, although the groove can be any shape such as a U-shaped slot or a channel in which the filaments can contact the groove and can be drawn together into one bundle by the rotation of the gathering shoe. The groove 11 generally has opposing sides 13(a) and 13(b) for groove 11A and 13(c) and 13(d) for groove 11B. As shown in FIG. 2, the opposing sides for the groove are preferably converging sides that meet at the junction of the sides 13(a) and 13(b) and 13(c) and 13(d) to form the bottom surfaces 14 of grooves 11 for each shoe 10. In FIG. 2, the holes 15 are shown extending into the shoe from the bottom surface 14 of the groove 11, and the holes 15 are shown as starting from the sides 13 of the groove 11. These side portions of the holes 15 are indicated in FIG. 2 by numeral 16. It is not necessary that all the holes have side portions 16, but a majority of the holes should have the side portions 16. The side portions 16 of the holes 15 are necessary, since the filaments and strand moving in groove 11A and B may not only contact the bottom surface 14 of grooves 11A and B but also the side surfaces 13(a), (b), (c) and (d). The side portions 16 of holes 15 can even extend up the sides 13(a), (b), (c) and (d) of grooves 11 for each shoe to rim 18 as long as the side portions 16 of the holes 15 do not structurally weaken the shoe so that it would structurally weaken the shoe so that it would fail in rotation. In FIG. 2, several of the bottom surfaces 21 for several holes 15 are shown, although all of the holes have the bottom surfaces.

In FIG. 2, the plurality of shoes 10A and 10B are mounted adjacent to each other for rotation on or with support member 26. The shoes 10A and B can rotate by bearings (not shown) placed in the central axis 12 of FIG. 1 so the shoes can rotate on support member 26. Also, the shoes can have a fixed attachment to support member 26 and support member 26 is rotatably mounted in shaft 24. Stop member 23 prevents the shoes 10A and 10B from slipping off support member 26 at one end. Any other method or apparatus known to those skilled in the art for rotating shoes or pulleys on shafts can be used. The support member 26 or shaft 24 can be mounted as shown in FIG. 3 in a filament forming process.

Figure 3:
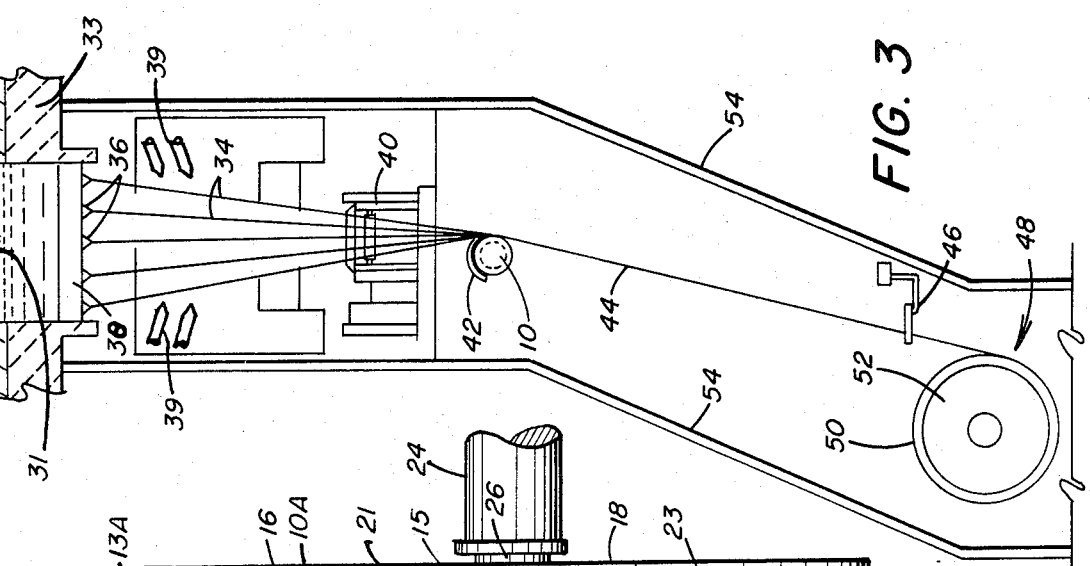
FIG. 3 is a diagramatic illustration of a fiber forming operation of the present invention.

As shown in FIG. 3, a heat softenable, fiberizable material 31 is contained in a melting furnace, a portion of which is shown at 33. The filaments 34 are drawn from molten cones of glass 36 from small orifices in a filament forming device. The filaments 34 are attenuated from the heat softened, fiberizable material such as fiberizable glass compositions, polyesters, polyamides and cellulosic materials and the like contained in the supported fiber forming apparatus 33. The fiber forming apparatus can be a bushing 38 in the case of the formation of glass fibers or a spinerette in the case of fiberization of other types of fibers. Preferably, the one or more gathering shoes are used in the method and manufacture of glass fibers. The glass fibers can be formed from any fiberizable glass composition such as "E-glass", "621-glass" and any more environmentally acceptable derivatives thereof such as low or free boron and/or low or free fluorine derivatives thereof, "A-glass", "C-glass" and "S-glass". The filaments are drawn across an applicator 40 which may be, for example, a belt applicator, a roller applicator, or the like where a coating of a lubricant binder and/or size is placed on the filaments. In addition, water sprays 39 may spray water onto the filaments to cool the filaments after being drawn from the molten material. The filaments are then gathered by the gathering shoe 10 into a unitary glass fiber strand 44. The gathering shoe 10 is shown in a supported housing 42 having a top shield. The glass fibers may be drawn at speeds of from 1000 to 18,000 feet per minute or more (762 to 5,486.4 meters per minute or more). The strand passes across a strand guide 46 which is driven by any suitable motor not shown in FIG. 3. In addition, the strand guide may be a spindle or spiral which are well known mechanism to those skilled in the art for manufacturing bundles of filaments. The strand 44 is wound on a winder mechanism 48 into a forming package 50 on mandrel 52. The sidewalls 54 provide support for the numerous devices used in forming the bundle of filaments from the attenuation of the filaments from the heat softened, fiberizable material.

In the preferred embodiment of the present invention, the shoe is used as a single shoe in a direct draw fiber forming process as described for FIG. 3. In the direct draw process, the bundle of fibers is wound onto the package as a precision wound package as more fully described in U.S. Pat. No. 3,998,404, hereby incorporated by reference where the strand guide 46 is used for aligning the strand properly on the package. The gathering shoe is attached to a shaft which is rotatably mounted in another shaft for free-wheeling rotation. The rotation is caused by the contact of the filaments with the gathering shoe. With this arrangement, the gathering shoe can be used for the index for speed control of the winder that attenuates the filaments.

The gathering shoe is about 5.75 inches (14.61 cm) in diameter with a 0.5 inch (1.27 cm) deep, annular V-groove. The V-groove has 16 cylindrical-shaped holes radially extending into the shoe for 0.5 inch (0.127 cm) beyond the bottom surface of the groove. The bottom surface of the V-groove has a width of 0.063 inch (0.159 cm). Each of the 16 holes extend up the sides of the V-groove a distance of 0.375 inch (0.953 cm). The side extensions of the holes up the sides of the V-groove terminate at about 0.125 inch (3.175 cm) from the rim of the shoe. The diameter of the holes at the bottom surface of the V-groove is 0.375 inch (0.953 cm).

This gathering shoe gathers the plurality of filaments into one unified bundle of filaments (strand).

The foregoing has described a filament gathering device and method of forming filaments with the gathering device, wherein the filaments and/or gathered filaments have a reduced tendency to wrap around the gathering device. The cylindrically shaped gathering device has an annular peripheral groove to contact the filaments and gather them into a unified bundle or strand. The gathering device has a plurality of holes radially extending toward the center of the gathering device.

We claim:

1. In an apparatus for forming one or more bundles of glass filaments from heat softenable, fiberizable glass forming material, comprising:
a multiple glass filament forming means, an applicator for applying chemicals for filament treatment, a rotatable gathering shoe for gathering filaments into bundles and a winder mechanism for collecting the bundles of filaments, the Improvement, comprising: one or more rotatable gathering shoes wherein each has an annular groove for receiving the glass fibers wherein each groove has a plurality of spaced apart radial holes extending into the center of the shoe for a distance less than the entire radial distance of the pulley wherein the holes have opposing and bottom sides, and where the gathering shoe when rotating reduces the wrapping of wet filaments and strands about the gathering shoe, since the holes sufficiently reduce the surface contact between the filaments and strands and the shoe.

2. Apparatus of claim 1, wherein the plurality of spaced apart holes radially extending into the gathering shoe provides for a reduction of the surface contact area experienced by the filaments and strands in contacting the shoe by about 20 to about 70 percent.

3. Apparatus of claim 1, wherein the majority of holes have sides extending up the sides of the groove beyond the bottom of the groove.

4. Apparatus of claim 1, wherein groove is a V-shaped groove.

5. Apparatus of claim 1, wherein the rotatable gathering shoe is a free-wheeling shoe.

6. Apparatus of claim 1, wherein the plurality of shoes are mounted adjacent to each other on one rotatable support member.

7. Apparatus of claim 1, wherein the height of the gathering shoe is much smaller than the diameter of the gathering shoe.

8. A method of forming a bundle of glass filaments from a heat softenable, fiberizable glass forming material, comprising:
 (a) forming the filaments from heat softened, fiberizable glass forming material,
 (b) applying a chemical treatment to the glass filaments,
 (c) gathering a plurality of filaments into one or more strands on one or more rotatable, free-wheeling gathering shoes, where one strand exits from each shoe, and wherein the one or more gathering shoes have a cylindrical shape with a peripheral surface having an annular recess formed therein to provide a groove having opposing and bottom surfaces, wherein the bottom surface of the groove has a plurality of spaced apart holes extending radially toward the center of the shoe for a distance less than the entire radial distance of the shoe, wherein the holes have opposing side and bottom surfaces so that the filaments first contact the shoe and are drawn into the strands, where the rotating gathering shoe reduces the wrapping of wet glass filaments and strands about the gathering shoe, since the holes sufficiently reduce the surface contact between the filaments and strands and the shoe, and
 (d) winding the one or more strands into a package of strands.

9. Method of claim 8, wherein the filaments are glass fibers.

10. Process of claim 8, wherein the gathering of the filaments is performed on the gathering shoe with a plurality of spaced apart holes radially extending toward the central axis of the shoe to provide for a reduction in the surface contact area experienced by the filaments and strands in contacting the shoe by about 20 to 70 percent.

11. Process of claim 8, wherein the gathering is with the gathering shoe having a majority of the holes with sides extending up the sides of the groove.

12. Process of claim 8, wherein the gathering is with the gathering shoe with a groove that is a V-shaped groove.

* * * * *